United States Patent [19]
Tanaka et al.

[11] Patent Number: 5,464,468
[45] Date of Patent: Nov. 7, 1995

[54] ROTARY ADSORPTION/DESORPTION GAS TREATING APPARATUS

[75] Inventors: Shinpei Tanaka, Neyagawa; Hirofumi Morimoto, Hirakata, both of Japan

[73] Assignee: Taikisha Ltd., Japan

[21] Appl. No.: 162,677

[22] Filed: Dec. 6, 1993

[30] Foreign Application Priority Data

Jun. 3, 1993 [JP] Japan .................................. 5-133603

[51] Int. Cl.⁶ .................................................. B01D 53/06
[52] U.S. Cl. .............................. 96/125; 96/129; 96/130; 96/144
[58] Field of Search ................................ 95/113; 96/121, 96/123, 125, 129, 130, 143–145, 150

[56] References Cited

U.S. PATENT DOCUMENTS

| | | | |
|---|---|---|---|
| 1,590,266 | 6/1926 | Tiedtke et al. | 96/150 X |
| 2,507,607 | 5/1950 | Miller | 96/125 |
| 2,541,694 | 2/1951 | Galson | 96/125 |
| 2,617,986 | 11/1952 | Miller . | |
| 2,639,000 | 5/1953 | Edwards | 96/125 |
| 3,252,273 | 5/1966 | Stephens | 96/125 |
| 3,487,608 | 1/1970 | Gräff | 96/130 X |
| 3,572,008 | 3/1971 | Hankison et al. | 96/144 X |
| 4,046,525 | 9/1977 | Matsuo et al. | 96/130 X |
| 4,176,523 | 12/1979 | Rousseau | 96/144 |
| 4,259,092 | 3/1981 | Matsuo et al. | 95/113 |
| 4,452,612 | 6/1984 | Mattia | 95/113 |
| 4,589,892 | 5/1986 | Leonard | 96/125 X |
| 4,775,484 | 10/1988 | Schmidt et al. | 96/125 X |
| 4,778,492 | 10/1988 | Dawson | 95/113 |
| 4,846,855 | 7/1989 | Tsujimoto | 95/113 |
| 5,017,202 | 5/1991 | Ogata et al. | 96/125 |
| 5,112,367 | 5/1992 | Hill | 96/130 X |

FOREIGN PATENT DOCUMENTS

| | | | |
|---|---|---|---|
| 0026854 | 4/1981 | European Pat. Off. | 96/125 |
| 0249003 | 12/1987 | European Pat. Off. . | |
| 2079007 | 10/1971 | France . | |
| 3618282 | 12/1987 | Germany | 95/113 |
| 4021072 | 1/1992 | Germany | 96/150 |
| 9204169 | 7/1992 | Germany . | |
| 51-98679 | 8/1976 | Japan . | |
| 61-2408 | 1/1986 | Japan . | |
| 131411 | 6/1989 | Japan . | |
| 4-310210 | 11/1992 | Japan | 96/150 |

Primary Examiner—Robert Spitzer
Attorney, Agent, or Firm—Webb Ziesenheim Bruening Logsdon Orkin & Hanson

[57] ABSTRACT

A rotary adsorption/desorption gas treating apparatus includes a rotary drum rotatable along a rotation axis and having a plurality of gas passage compartments arranged in a peripheral direction of the drum. The apparatus further includes an adsorbing element cassette mounted inside each of the gas passage compartments and including a gas-permeable adsorbing mat. The rotational range of the rotary drum is divided between an adsorption zone and a desorption zone. In the adsorption zone, a treatment subject gas is allowed to pass the gas passage compartments in the direction along the rotation axis of the rotary drum. In the desorption zone, a refreshing gas is allowed to pass the gas passage compartments in the direction along the rotation axis of the rotary drum. The adsorbing mat, when mounted in the compartment, includes a portion thereof oriented normal or inclined relative to a side end face of the rotary drum.

18 Claims, 8 Drawing Sheets

ROTARY ADSORPTION/DESORPTION GAS TREATING APPARATUS

BACKGROUND OF THE INVENTION

1. Field of the Invention

The present invention relates to a rotary adsorption/desorption type gas treating apparatus for eliminating a target substance from treatment subject gas containing the substance by adsorbing the substance and then desorbing the same. The apparatus is used, for instance, for separating and eliminating a paint solvent from atmosphere containing the solvent exhausted from a painting factory.

2. Description of the Related Art

FIGS. 8 and 9 show a known apparatus of the above-described type. As shown, this apparatus includes a rotary drum 1' rotatable about a pivotal axis P and having a plurality of gas-passage compartments 4' arranged side by side along the peripheral direction of the drum and defines, in the peripheral direction, an adsorption zone X' for allowing passage of treatment subject gas G through the compartment(s) 4' in the radial direction of the drum and a desorption zone Y' for allowing passage of refreshing gas H through the compartment(s) 4' in the generally opposite radial direction. At each gas-passage compartment 4', there is provided a gas-permeable adsorbing element 7', in the form of a flat plate element, with an inclination relative to the radial direction of the drum.

In operation, in accordance with rotation of the rotary drum 1', the respective compartments 4' are alternately brought into registered relationship with the adsorption zone X' and the desorption zone Y'. In the adsorption zone X', as the subject gas is passed through the adsorbing element 7', the target substance contained in the gas is adsorbed on the adsorbing element 7'. Then, in the desorption zone Y', the substance on the element 7' is desorbed to the refreshing gas H, such that the element 7' becomes refreshed to be ready for a next adsorption/desorption cycle. In this manner, the apparatus can treat the subject gas G continuously.

Further, each gas-passage compartment 4' includes a partition wall 3' which serves to separate this compartment 4' from another compartment adjacent thereto. In operation, when the compartment 4' is placed between the adsorption zone X' and the desorption zone Y', the partition wall 3' serves as an inter-compartment partition for partitioning between the adsorption zone X' and the desorption zone Y' in order to prevent gas leakage therebetween.

According to the above-described conventional construction, the adsorbing element 7' in the form of a flat plate is disposed with an inclination relative to the radius of the rotary drum 1', thereby to reduce the diameter of the drum 1' while maximizing the gas passage area of the adsorbing element 7'. However, since the subject gas or refreshing gas is caused to pass the adsorption zone X' or the desorption zone Y' along the radial direction of the rotary drum, it has been necessary to form, at the center portion of the rotary drum 1', an outlet passage 12' for the subject gas G' after adsorption treatment and an inlet passage 13' for the refreshing gas H before desorption treatment, or an inlet passage 11' for the subject gas G before the adsorption treatment and an outlet passage 14' for the refreshing gas H' after the desorption treatment each with a passage sectional area commensurate with an amount of the gas to be passed therethrough. This imposes limit on the reduction of the diameter of the rotary drum 1' and consequently on the compactness of the entire apparatus.

SUMMARY OF THE INVENTION

A primary object of the present invention is to provide an improved gas treating apparatus which enables further reduction of the diameter of the rotary drum while retaining a large gas treatment capacity.

For fulfilling the above-noted object, a rotary adsorption/desorption gas treating apparatus, according to the present invention, comprises a rotary drum rotatable along a rotation axis including a plurality of gas passage compartments arranged in a peripheral direction of the drum, and an adsorbing element cassette mounted inside each of the gas passage compartments and including a gas-permeable adsorbing mat. The rotational range of the rotary drum is divided between an adsorption zone and a desorption zone. In the adsorption zone, a treatment subject gas is allowed to pass the gas passage compartments in the direction along the rotation axis of the rotary drum. In the desorption zone, a refreshing gas is allowed to pass the gas passage compartments in the direction along the rotation axis of the rotary drum. The adsorbing mat, when mounted in the compartment, includes a portion oriented normal or inclined relative to a side end face of the rotary drum.

In operation, with rotation of the rotary drum, the respective gas passage compartments are alternately brought into registered relationship with the adsorption zone and the desorption zone. In the adsorption zone or the desorption zone, the subject gas or the refreshing gas is respectively introduced through the gas-permeable adsorbing mat mounted within the compartment, in the direction along the rotation axis of the drum.

In the adsorption zone, by the passage of the subject gas through the adsorbing mat, the elimination-target substance contained in the subject gas is adsorbed onto the mat. In the desorption zone, by the passage of the refreshing gas through the adsorbing mat, the target substance adsorbed on the mat is desorbed to the refreshing gas, whereby the adsorbing mat of the adsorbing-element cassette is refreshed to be ready for a next adsorption/desorption cycle. In this manner, the apparatus is capable of continuously treating the treatment-subject gas.

Further, the adsorbing mat, when assembled with the cassette and mounted therewith within the compartment, includes a portion oriented normal or inclined relative to a side end face of the rotary drum. In comparison with e.g. an arrangement where the adsorbing mat is disposed along a plane extending parallel with the side end face of the drum, the arrangement of the invention can allow the mat to obtain a larger gas passage area within the limit of the area of the side end face of the drum.

As described above, with the apparatus of the present invention, the passage of subject gas or refreshing gas through the adsorbing mat in the adsorption or desorption zone takes place in the direction along the rotation axis of the rotary drum. That is, unlike the conventional construction shown in FIGS. 8 and 9, the construction of the invention eliminates the necessity of reserving the subject gas and refreshing gas passages at the inner central portion of the rotary drum. In this way, the construction has eliminated the limit in the reduction of the drum diameter due to the formation of the gas passages at the inner center of this drum.

Further, in spite of the possibility of further reduction in the drum diameter, the adsorbing mat can maintain a large gas passage area thanks to the arrangement in which the adsorbing mat is so disposed as to have a portion thereof oriented normal or inclined relative to the side end face of the drum. In this way, the invention has fully achieved its intended object of providing an improved gas treating apparatus which enables further reduction of the diameter of the rotary drum while retaining a large gas treatment capacity. Consequently, the entire apparatus too may be formed compact while achieving higher treatment capacity.

According to one aspect of the invention, the adsorbing-element cassette is formed like a container with the adsorbing mat being tensely attached on a periphery of the container. Further the container-like cassette includes an opened face which is to be oriented normal to the direction of the gas passage to and from the gas passage compartment when the cassette is mounted in position within the compartment.

With the above construction, the subject gas in the adsorption zone or the refreshing gas in the desorption zone is caused to pass the adsorbing mat attached around the adsorbing-element cassette in the form of a container. More particularly, the subject gas of refreshing gas is introduced through the opened face of the container-like cassette into the inside of the cassette and then the gas exits the cassette through the adsorbing mat attached around the periphery of the cassette to the outside. In this case, the opened face functions as a gas inlet opening. Alternately, the gas is introduced into the cassette through the mat attached around the periphery and then the gas exits the cassette from the opened face. In this case, the opened face functions as a gas outlet opening.

In accordance with the above construction, the adsorbing-element cassette is constructed in the form of a container and the adsorbing mat is tensely attached to the periphery of the container. Therefore, in comparison with the planar arrangement of the adsorbing mat having the same area, the adsorbing-element cassette can be formed more compact and also mounting and dismounting operations of the cassette are rendered easier.

Further and other objects, features and effects of the invention will become more apparent from the following more detailed description of the embodiments of the invention with reference to the accompanying drawings.

DESCRIPTION OF THE PREFERRED EMBODIMENTS

Preferred embodiments of a rotary adsorption/desorption gas treating apparatus relating to the present invention will be described in particular with reference to the accompanying drawings.

Figure 1:
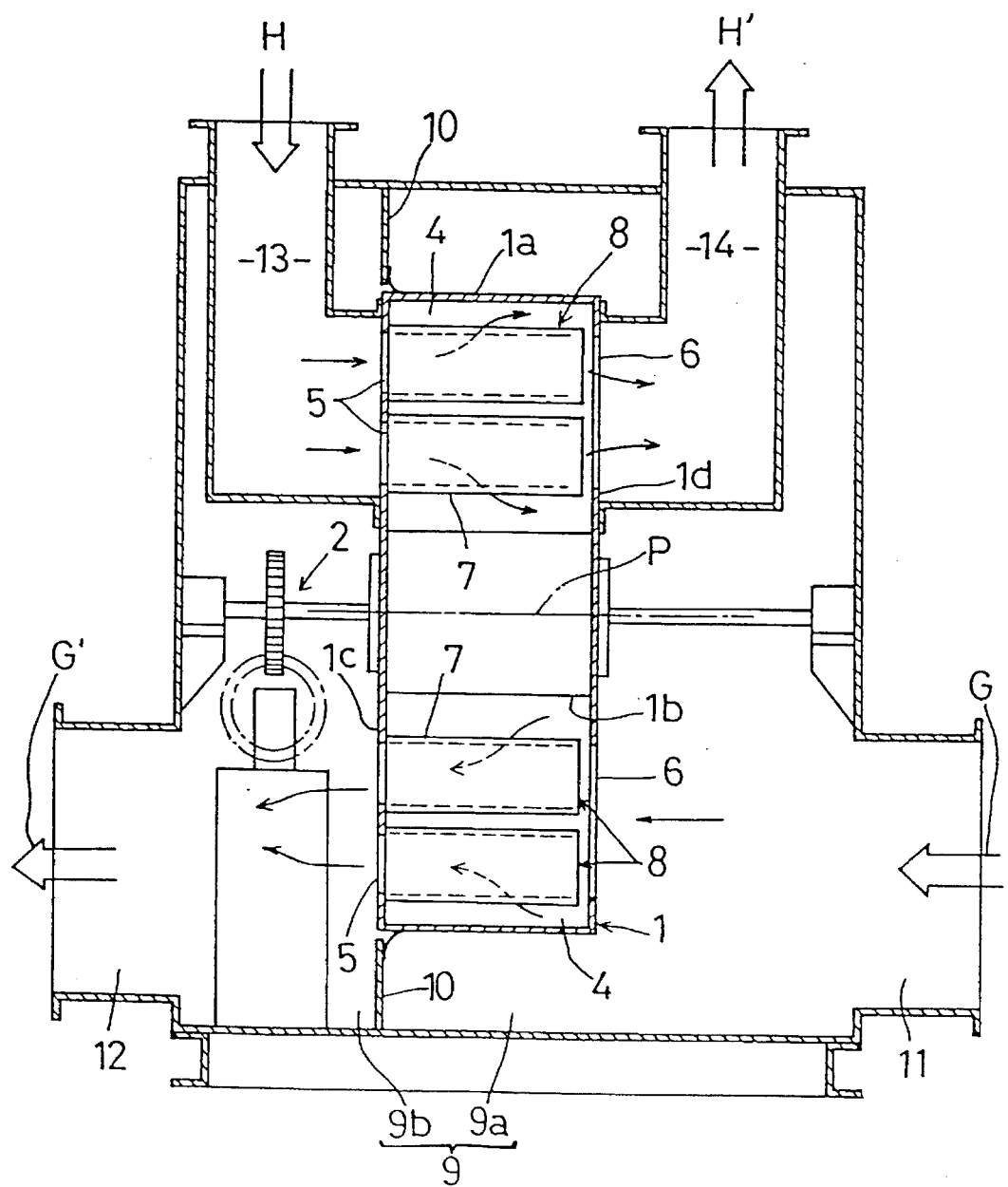
FIG. 1 is a side view in section showing a preferred embodiment of the invention.
Figure 2:
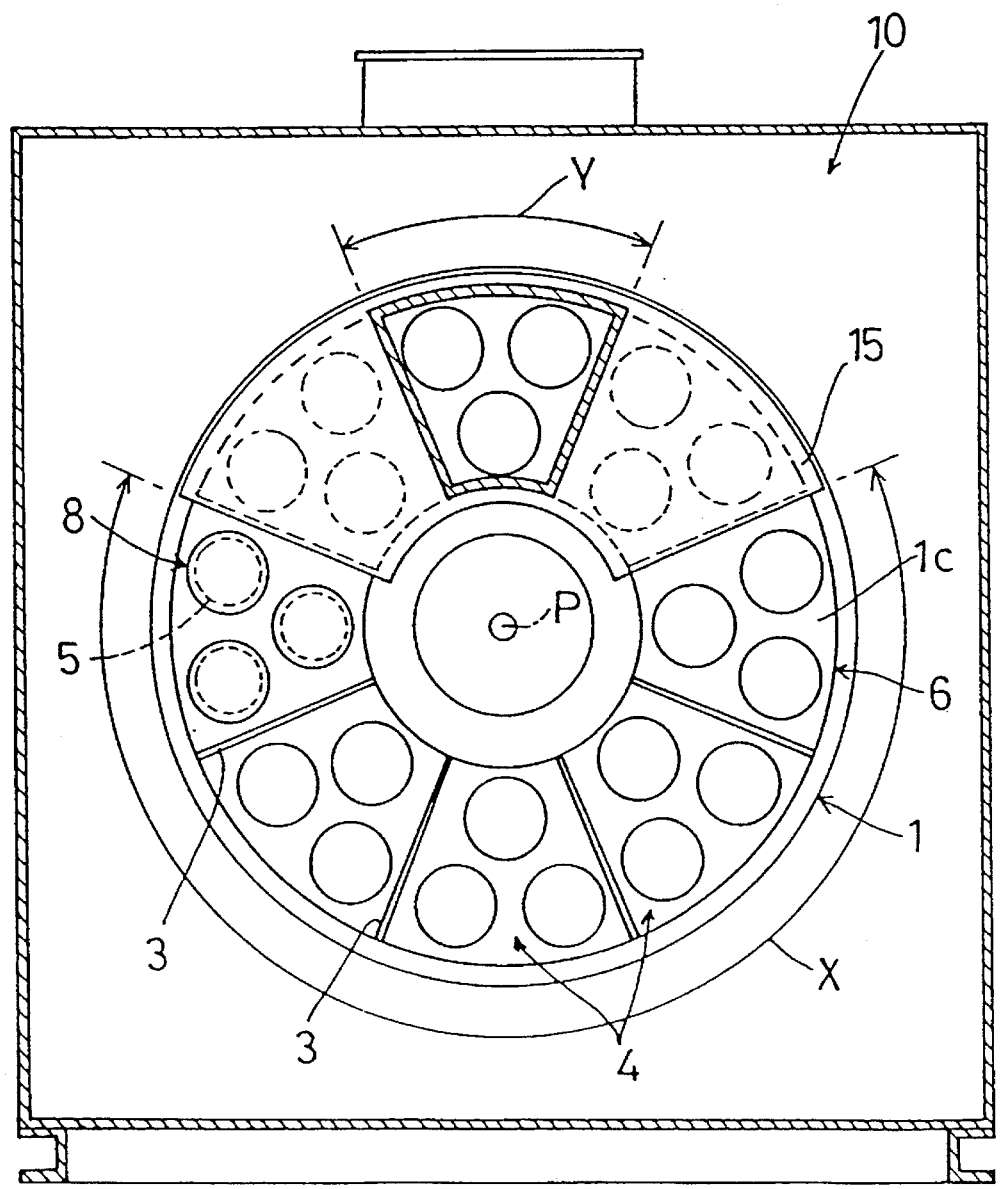
FIG. 2 is a front view in section showing the embodiment.

In FIGS. 1 and 2, a numeral 1 denotes a rotary drum driven to rotate by a drive unit 2. This rotary drum 1 includes a drum body having an outer peripheral wall 1a, an inner peripheral wall 1b, one side wall 1c and the other side wall 1d and also includes, inside the drum body, a plurality of gas-passage compartments 4 arranged side by side in the peripheral direction of the drum and separated from one another by inner partition walls 3.

The side wall 1c defines a plurality of circular openings 5, with three of them being disposed in a zigzag format at each gas-passage compartment 4. The other side wall 1d defines a plurality of sector-shaped recesses 6 corresponding in number and position to the circular openings 5. Then, by using these circular openings 5 and the sector recesses 6 as gas inlet or outlet openings, treatment-subject gas is caused to pass through the respective gas-passage compartments 4 in a direction along a rotation axis P of the rotary drum.

At each gas-passage compartment 4, there is detachably mounted an adsorbing-element cassette 8 having a gas-permeable adsorbing mat 7.

The above-described rotary drum 1 is housed in a drum chamber 9, inside of which is partitioned between an inlet section 9a and an outlet section 9b by means of an inner partition wall 10. The inlet section 9a is communicated with a feed passage 11 for introducing the treatment-subject gas G, while the outlet section 9b is communicated with an exhaust passage 12 for exhausting the subject gas G' after adsorption treatment.

The outlet section 9b includes a feed passage 13 for hot refreshing (desorbing) gas H, the passage being partitioned from the rest of the section 9b. Whereas, the inlet section 9a includes an exhaust passage 14 for the refreshing gas H' after desorption operation, with the exhaust passage 14 being partitioned from the rest of the section 9a. Further, an opened terminal end face of the refreshing-gas feed passage 13 is placed in close opposition to the side end face 1c of the drum, and an opened terminal face of the refreshing-gas exhaust passage 14 is placed in close opposition to the other side end face 1d of the drum.

That is, in a rotational range of the rotary drum 1, a portion extending through the inlet section 9a and the outlet section 9b provides an adsorption zone X. And, a desorption zone Y is provided by a further portion in the rotational range located at the above-described predetermined phase where the opened terminal end face of the refreshing-gas feed passage 13 is opposed, across the rotary drum, to that of the refreshing-gas exhaust passage 14. In operation, with rotation of the rotary drum 1, the respective gas-passage compartments 4 are alternately brought into registered relationship with the adsorption zone X and the desorption zone Y. In the adsorption zone X, the treatment-subject gas G, and in the desorption zone Y, the refreshing gas H, is caused to pass the compartments 4 in the direction along the rotational axis P of the rotary drum, in which compartments 4 each gas passes through the adsorbing mats 7 of the adsorbing-element cassettes 8 mounted within the compartments 4.

In the adsorption zone X, as the subject gas G passes through the adsorbing mats 7, elimination-target substance contained in the gas G is adsorbed on the mats 7. Thereafter, in the desorption zone Y, as the refreshing gas H passes through the adsorbing mats 7 having adsorbed the target substance, the substance is desorbed from the mats 7 to the refreshing gas H, whereby the mats 7 become refreshed to be ready for a next adsorbing cycle. As these adsorption and desorption operations are repeatedly carried out, the apparatus can treat the subject gas G in a continuous manner.

A numeral 15 denotes a gas shield plate for blocking gas passage into those gas-passage compartments 4 which are located at borders between the adsorption zone X and the desorption zone Y. More particularly, this gas shield plate 15, in cooperation with the inner partition walls 3, serves to prevent gas leakage which would otherwise occur when one compartment 4 is located across the adsorption zone X and the desorption zone Y.

Figure 3:
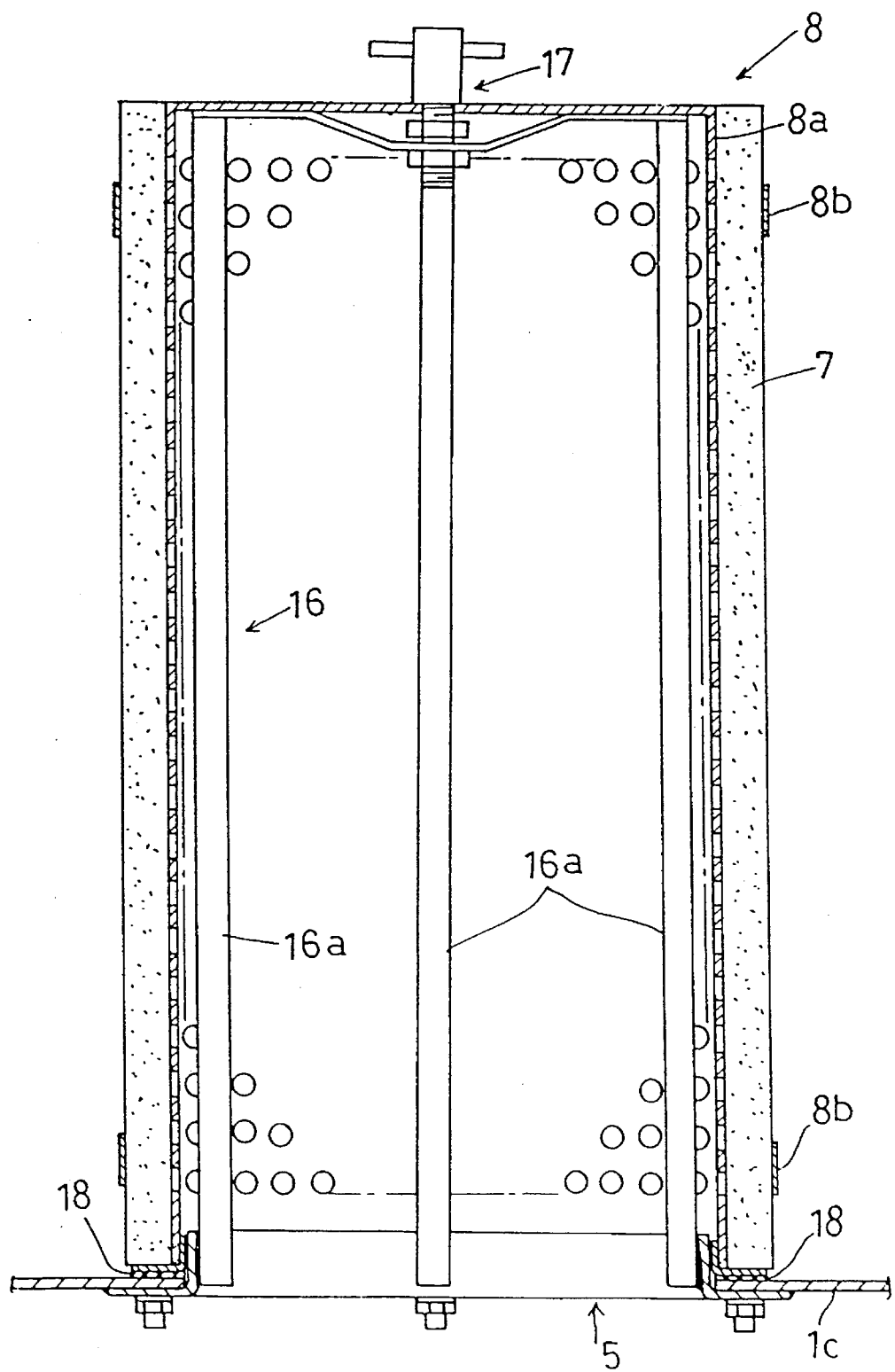
FIG. 3 is an enlarged view in section of an adsorbing-element cassette used in the embodiment.

FIG. 3 shows the construction of the adsorbing-element cassette 8. The cassette 8 includes a cassette body 8a in the form of a bottom-equipped cylinder (an example of a container-like device) having a peripheral wall defining a plurality of through holes, and the adsorbing mat 7 is tensely wrapped around the peripheral wall and fastened by fasteners 8b to the cassette body 8a at opposed ends of this cylindrical body 8a.

Next, a mounting arrangement of the above-described adsorbing-element cassette 8 to the gas-passage compartment 4 will be described. Generally, this arrangement utilizes a cassette guide 16 extending from one circular opening 5 of the side end drum face 1c into the interior of the compartment 4. Specifically, this cassette guide 16 comprises a frame-like structure formed by a plurality of rod members 16a fixedly provided on the side end face 1c of the rotary drum. Then, the adsorbing-element cassette 8 is fitted outwardly onto each cassette guide 16 in such a manner that the opened end face of the adsorbing-element cassette 8 having the form of a bottom-equipped container is brought into registered opposition to the circular opening 5, namely, the opened end face of the cassette is placed in normal to the direction of gas passage through the compartment 4. In this condition, the cassette is fixed in place by means of a screw construction 17 provided at the bottom of the cassette body 8a and a projecting end of the cassette guide 16.

In operation, in the adsorption zone X, the opened end face of the adsorbing-element cassette 8 in the form of the bottom-equipped container functions as a gas inlet opening for allowing passage of the treatment-subject gas G from the outside of the periphery of the cassette through the adsorbing mat 7 attached on the periphery to the inside of the cassette. On the other hand, in the desorption zone Y, the opened end face of the adsorbing-element cassette 8 functions as a gas inlet opening for allowing passage of the refreshing gas H from the inside of the cassette 8 through the adsorbing mat 7 on the periphery to the outside of the cassette. As described above, the direction of the passage of the subject or refreshing gas through the gas-passage compartment 4 in the adsorption and desorption zone X and Y is aligned with the rotational axis of the rotary drum; and the adsorbing mat 7 is set normal to the side end face of the drum with the adsorbing-element cassette 8 is mounted within the drum. With this construction, in comparison with the further construction where the adsorbing mat 7 is disposed parallel to the drum end face, it is possible for the adsorbing mat 7 to obtain a maximum gas passage area within the limit of the end face area of the rotary drum.

Further, with the specific embodiment of the above-described construction in which the adsorbing-element cassette 8 is formed like a bottom-equipped container and the adsorbing mat 7 is tensely attached to the periphery of the container, the adsorbing-element cassette 8 can be formed compact and can be easily mounted and dismounted to and from the drum.

A reference numeral 18 denotes a sealing element attached to a brim portion of the opened end of the adsorbing-element cassette 8. With fixing of the cassette 8 by the screw construction 17, the sealing element 18 is pressed between the brim portion of the cassette 8 and the side end wall 1c of the drum, thereby to provide a sealing effect therebetween.

Further embodiments of the invention will be described next.

Figure 4:
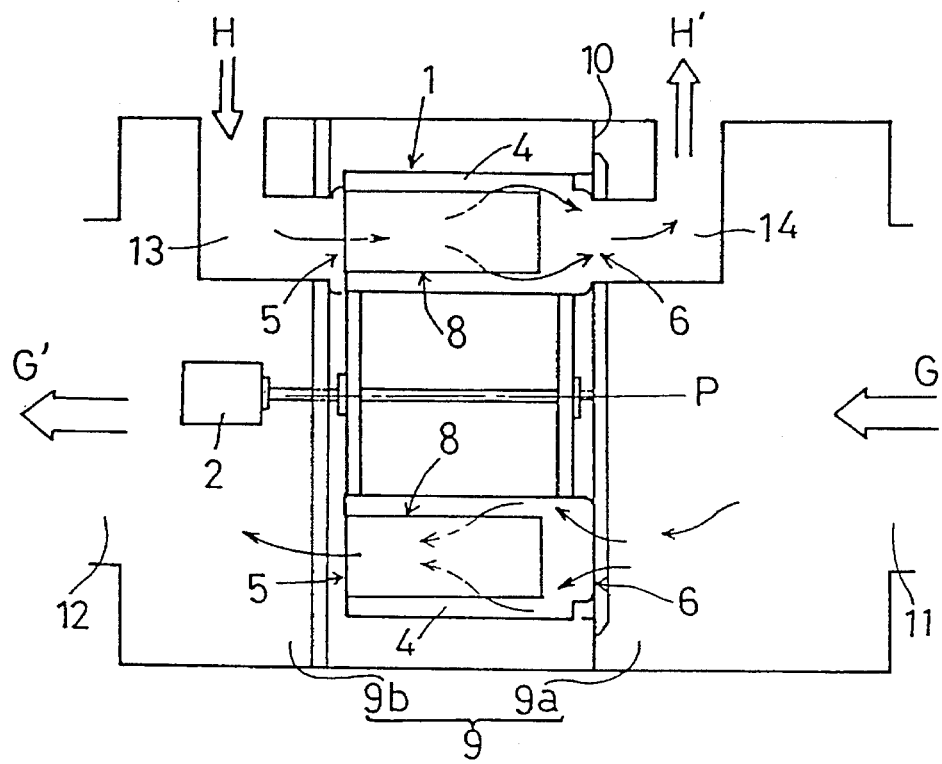
FIG. 4 is a side view in section showing a further embodiment of the invention.
Figure 5:
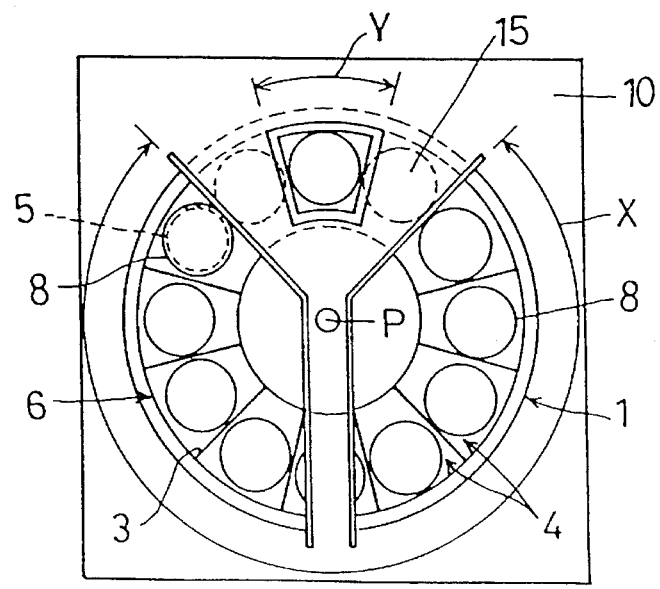
FIG. 5 is a front view in section showing the further embodiment.

As shown in FIGS. 4 and 5, in case the construction is to treat a smaller amount of the subject gas, the rotary drum 1 may be formed with a smaller diameter such that the circular openings 5 of the side end wall 1c may correspond in one-to-one relationship to each of the gas-passage compartments 4. Conversely, in case the construction is to treat a larger amount of the subject gas, the rotary drum 1 will be formed with a larger diameter such that four or more of the adsorbing-element cassettes 8 will be provided to each of the compartment 4.

Moreover, in such case where various numbers of the adsorbing-element cassettes 8 are provided for each of the gas-passage compartments 4 depending on an amount of the subject gas to be treated, the constructions may commonly use the same cassettes 8. This will be advantageous for minimizing the manufacturing and maintenance costs of the cassettes 8.

Figure 6:
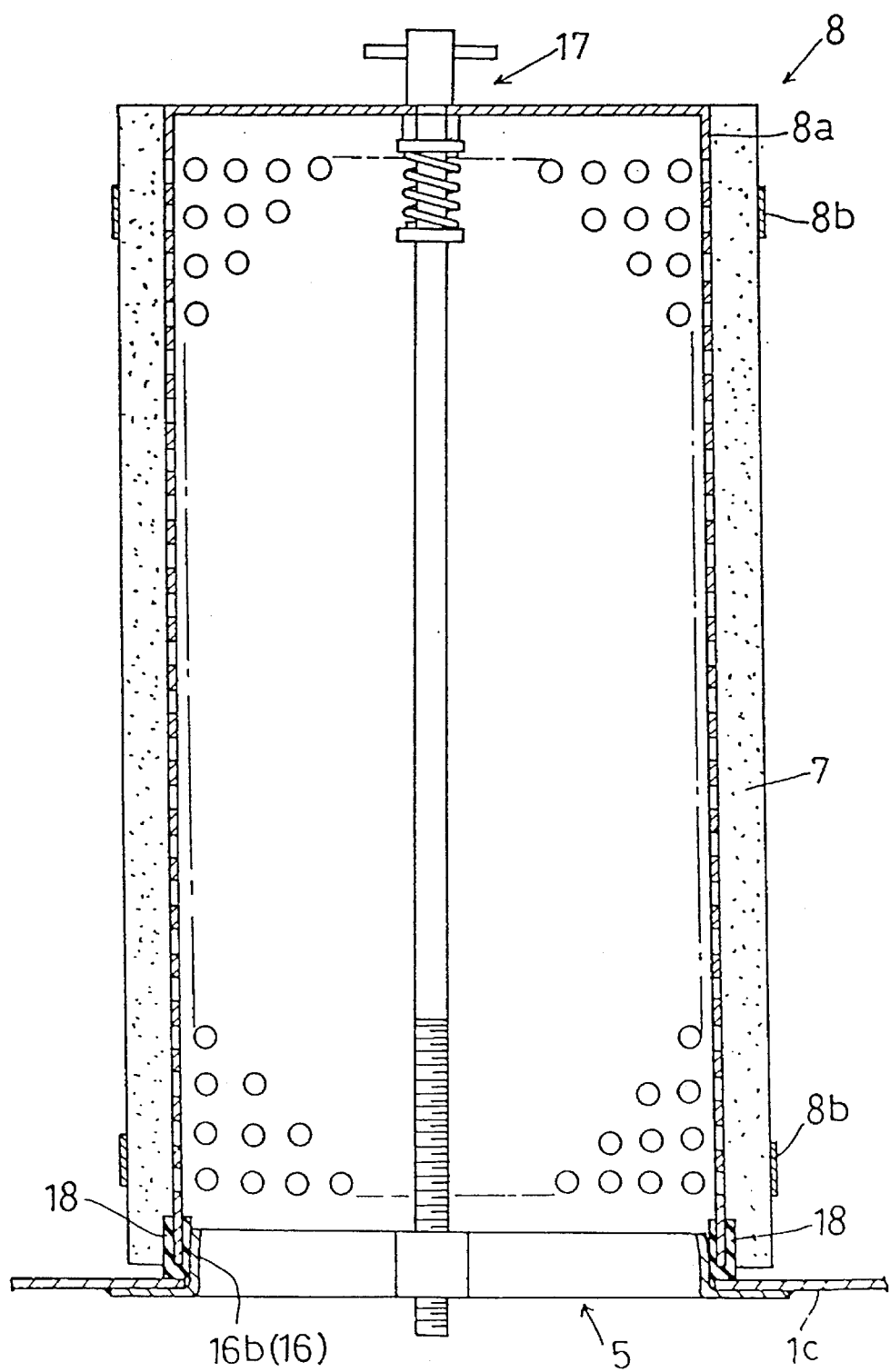
FIG. 6 is an enlarged view in section of a further embodiment of an adsorbing-element cassette.
Figure 7:
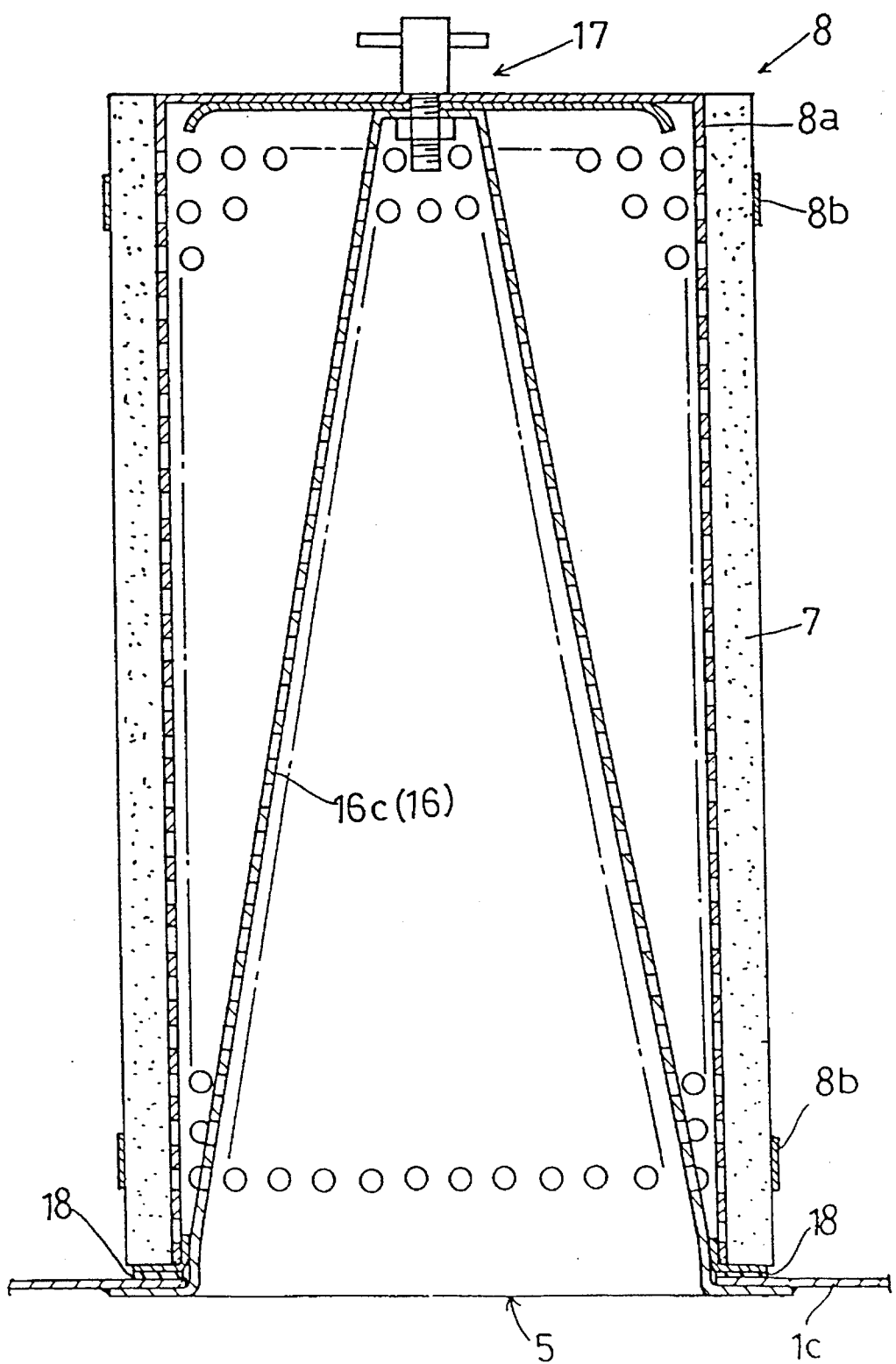
FIG. 7 is an enlarged view in section of a still further embodiment of an adsorbing-element cassette.
Figure 8:
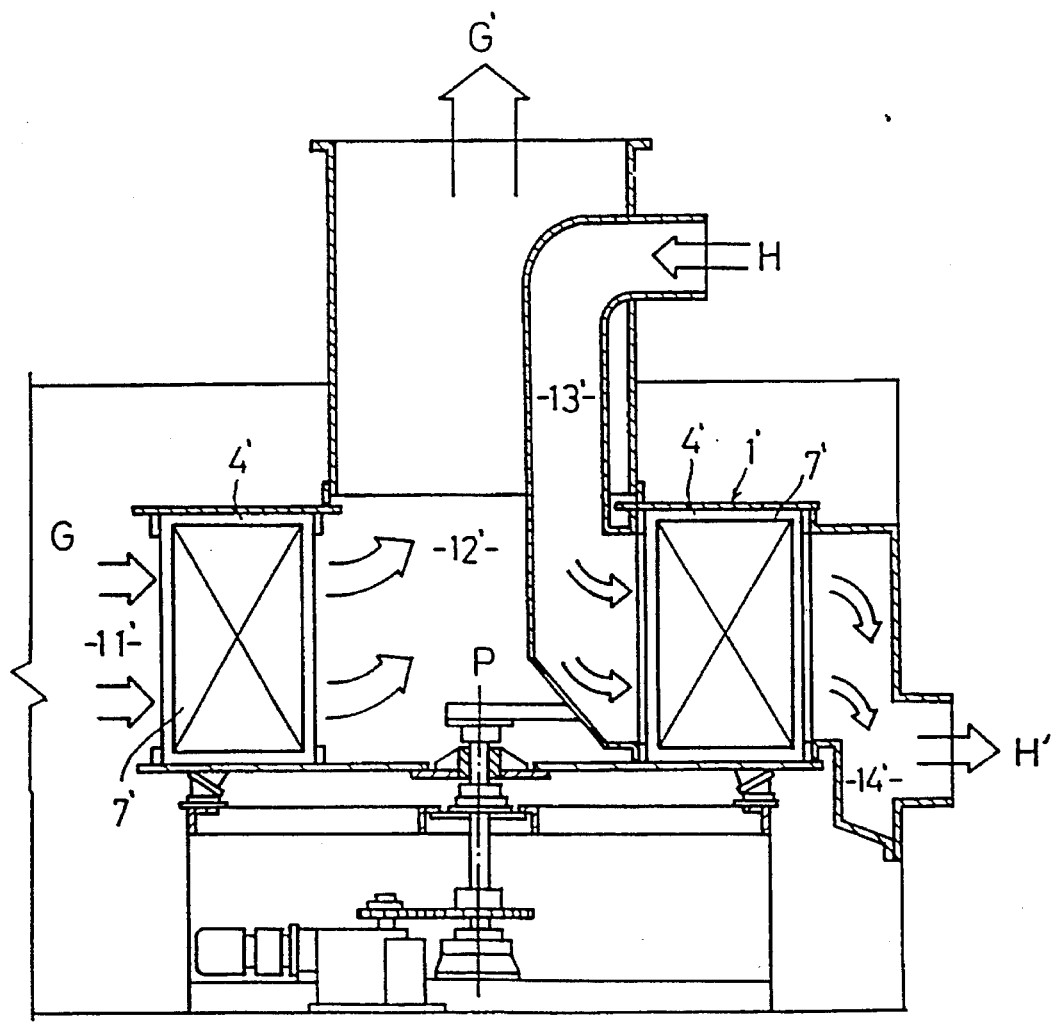
FIG. 8 is a side view in section showing a conventional art.
Figure 9:
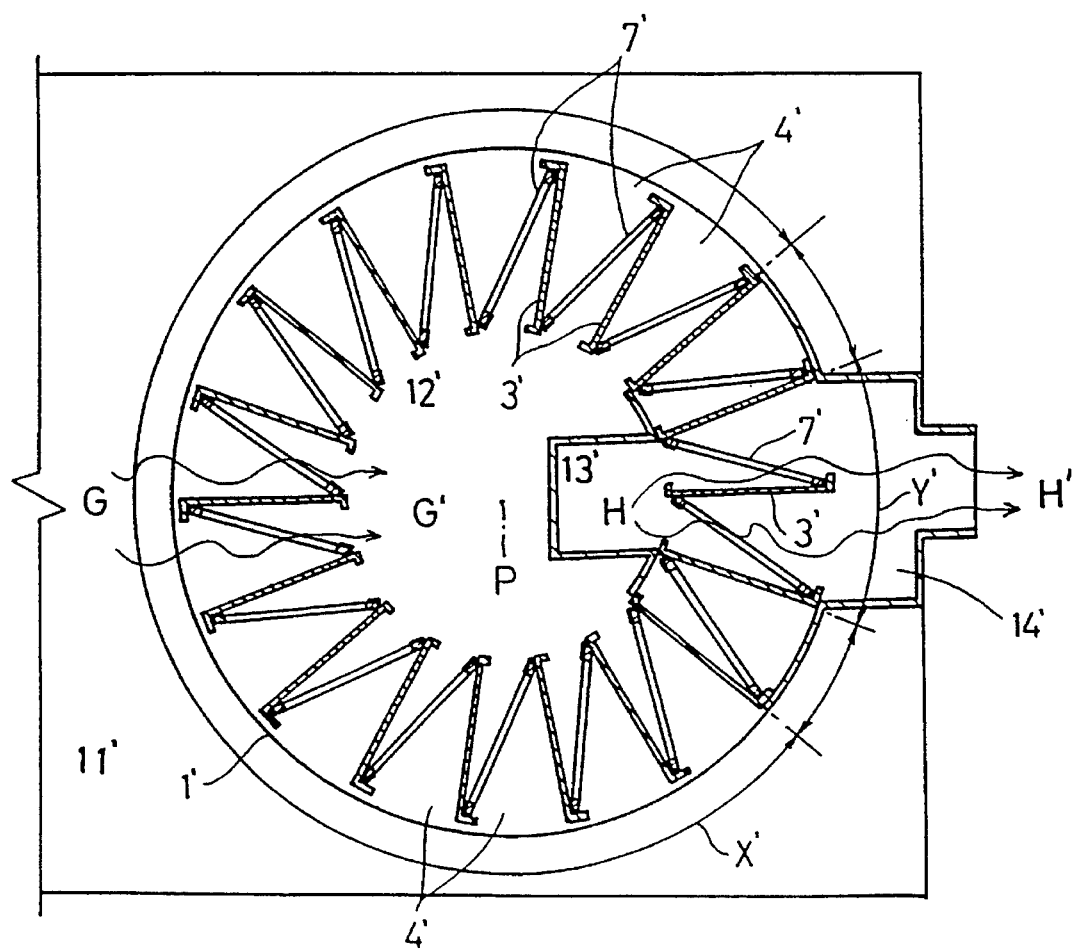
FIG. 9 is a plane view in section of the conventional art.

In the foregoing embodiment, the cassette guide 16 comprises a frame-like structure consisting essentially of a plurality of rod members 16a. While, various modifications of this cassette guide 16 are conceivable. For instance, as shown in FIG. 6, the cassette guide 16 may comprise a ring-shaped band member 16b provided at the peripheral edge of the circular opening 5 of the side end wall 1c of the drum. Further alternatively, as shown in FIG. 7, the cassette guide 16 may comprise a porous conical member 16c which functions also as a gas flow rectifier means inside the cassette 8.

In the foregoing embodiment, the sealing element 18 is interposed between the brim portion of the opened end of the adsorbing-element cassette 8 and the side end wall 1c of the rotary drum. Instead, as shown in FIG. 6, the sealing element 18 may be interposed between the ring-shaped band member 16b acting as the cassette guide 16 and the opened inner peripheral portion of the adsorbing-element cassette 8. Further modifications in the sealing arrangement in the attachment of the cassette 8 will be readily conceivable for those skilled in the art.

In the foregoing embodiment, in the adsorption zone X, the treatment-subject gas is introduced from the outside of the periphery of the adsorbing-element cassette 8 in the form of a bottom-equipped container to the inside of this cassette 8. Also, in the desorption zone Y, the refreshing gas is introduced from the inside of the cassette 8 and exhausted through the periphery of the same to the outside. Alternately, it is also conceivable for the subject gas to travel from the inside of the cassette 8 to the outside of the periphery of the same in the adsorption zone X and for the refreshing gas to travel from the outside of the periphery of the cassette 8 to the inside of the same in the desorption zone Y. Further, in either the adsorption zone X or the desorption zone Y, the subject or refreshing gas may travel from the inside of the cassette 8 to the outside of the periphery of the same, or in the opposite direction, i.e. from the outside of the periphery of the cassette to the inside of the same.

Various modifications will be conceivable in the specific construction of the adsorbing-element cassette 8 for allowing the adsorbing mat 7 thereof to have a portion oriented normal or inclined relative to the side end face of the drum when the cassette 8 is mounted to the drum or in the specific construction of attaching the adsorbing mat 7 to the cassette 8. Also, in the case of the construction where the adsorbing-element cassette 8 is formed like a container and the adsorbing mat 7 is attached to the periphery of the cassette 8, the specific shape of this container-like cassette 8 is not limited to the bottom-equipped cylindrical configuration, but may be a bottom-equipped angular cylindrical configuration, a conical configuration, a bowl-like configuration and so on. The specific configuration of the adsorbing-element cassette 8 is not particularly limited in the present invention.

The treatment-subject gas G is not limited to the solvent-containing exhaust gas from the painting factory. The rotary adsorption/desorption gas treating apparatus of the present invention may be used for treating various types of gas in a variety of fields of application.

In the foregoing embodiment, the rotary drum 1 is disposed with the rotational axis P thereof oriented horizontal. Instead, the drum 1 may be disposed with the axis P oriented vertical. Further, the specific gas flow passage construction provided around the rotary drum 1 is not limited to that disclosed in the foregoing embodiment.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. A rotary adsorption/desorption gas treating apparatus comprising:

a rotary drum rotatable along a rotation axis including a plurality of gas passage compartments arranged in a peripheral direction of the drum; and an adsorbing-element cassette mounted inside each of said gas passage compartments and including a gas-permeable adsorbing mat, said adsorbing mat, when mounted in said compartment, including a portion oriented one of normal and inclined relative to a side end face of said rotary drum, wherein said adsorbing mat adsorbs an elimination-target substance contained in a treatment subject gas, a rotational range of said rotary drum being divided between an adsorption zone and a desorption zone, in said adsorption zone, the treatment subject gas being allowed to continually pass said gas passage compartments in a direction along said rotation axis of the rotary drum, in said desorption zone, a refreshing gas is allowed to continuously pass said gas passage compartments in the direction along said rotation axis of the rotary drum wherein said apparatus continuously adsorbs said elimination-target substance in said adsorption zone and continuously desorbs said elimination-target substance in said desorption zone.

2. A gas treating apparatus as defined in claim 1, wherein said adsorbing-element cassette is formed like a container with said adsorbing mat being tensely attached on a periphery of the container, said container-like cassette including an opened face which is to be oriented normal to the direction of the gas passage to and from said gas passage compartment when said cassette is mounted in position within said compartment.

3. A gas treating apparatus as defined in claim 2, wherein said adsorbing-element cassette includes a cassette body in the form of a bottom-equipped container having a peripheral wall defining a plurality of through holes.

4. A gas treating apparatus as defined in claim 1, wherein a gas shield plate is provided at a border between said adsorption zone and said desorption zone to prevent gas leakage therebetween.

5. A gas treating apparatus as defined in claim 1, wherein a plurality of said adsorbing-element cassettes are detachably mounted within each said gas passage compartment.

6. A gas treating apparatus as defined in claim 1 wherein said adsorbing-element cassette includes a cassette body in the form of a bottom-equipped container having a peripheral wall defining a plurality of through holes.

7. A gas treating apparatus as defined in claim 1, wherein said adsorbing-element cassette is fitted outwardly on a cassette guide including a plurality of rod members secured to a side end wall of said rotary drum and fixed thereto by a screw means.

8. A gas treating apparatus as defined in claim 7, wherein a sealing element is pressed between said adsorbing-element cassette and said side end wall of the rotary drum thereby to provide sealing therebetween.

9. A gas treating apparatus as defined in claim 1, wherein one end of said adsorbing-element cassette is fitted onto a ring-shaped band member provided at a peripheral edge of a circular opening defined in a side end wall of said rotary drum and fixed on said ring-shaped band member by a screw means extending between the other end of said adsorbing-element cassette and said ring-shaped band member.

10. A gas treating apparatus as defined in claim 9, wherein a shielding element is pressed between said adsorbing-element cassette and said ring-shaped band member for preventing gas leakage therebetween.

11. A rotary adsorption/desorption gas treating apparatus comprising:

a rotary drum rotatable along a rotation axis including a plurality of gas passage compartments arranged in a peripheral direction of the drum, wherein a rotational range of said rotary drum is divided between an adsorption zone and a desorption zone, in said adsorption zone, the treatment subject gas being allowed to continuously pass said gas passage compartments in a direction along said rotation axis of the rotary drum, in said desorption zone, a refreshing gas is allowed to continuously pass said gas passage compartments in the direction along said rotation axis of the rotary drum;

adsorbing means provided inside each of said gas passage compartments for continuously adsorbing an elimination-target substance contained in a treatment subject gas, wherein said apparatus continuously adsorbs said elimination-target substance in said adsorption zone and continuously desorbs said elimination-target substance in said desorption zone.

12. A gas treating apparatus as defined in claim 11, wherein a gas shield plate is provided at a border between said adsorption zone and said desorption zone to prevent gas leakage therebetween.

13. A gas treating apparatus as defined in claim 11, wherein said adsorbing means is formed like a container with an adsorbing mat being tensely attached on a periphery of said adsorbing means.

14. A gas treating apparatus as defined in claim 13, wherein said adsorbing mat is attached within said gas passage compartment in such a manner that said adsorbing mat has a portion thereof oriented normal or inclined relative to an end face of said rotary drum.

15. A gas treating apparatus as defined in claim 11, wherein said adsorbing means is formed like a container with an adsorbing mat being tensely attached on a periphery of said adsorbing means, said adsorbing means being attached within said gas passage compartment in such a manner that an opened face of the container is oriented normal to the direction of the gas passage to and from said gas passage compartment.

16. A gas treating apparatus as defined in claim 15, wherein said adsorbing mat is attached within said gas passage compartment with a portion of said adsorbing mat being oriented normal or inclined relative to a side end face of said rotary drum.

17. A rotary adsorption/desorption gas treating apparatus comprising:

a rotary drum rotatable along a rotation axis including a plurality of gas passage compartments arranged in a peripheral direction of the drum;

an adsorbing-element cassette mounted inside each of said gas passage compartments and including a gas-permeable adsorbing mat, wherein each of said adsorbing-element cassettes are fitted outwardly on a cassette guide including a plurality of rod members secured to a side end wall of said rotary drum and fixed thereto by a screw means;

wherein said adsorbing mat adsorbs an elimination-target substance contained in a treatment subject gas;

a rotational range of said rotary drum being divided between an adsorption zone and a desorption zone, in said adsorption zone, the treatment subject gas being allowed to pass said gas passage compartments in a direction along said rotation axis of the rotary drum, in said desorption zone, a refreshing gas is allowed to pass said gas passage compartments in the direction along said rotation axis of the rotary drum; and said adsorbing mat, when mounted in said compartment, including a portion oriented one of normal and inclined relative to a side end face of said rotary drum.

18. A gas treating apparatus as defined in claim 17, wherein a sealing element is pressed between each of said adsorbing-element cassette and said side end wall of the rotary drum thereby to provide sealing therebetween.

* * * * *